(12) United States Patent
Morris

(10) Patent No.: US 11,377,020 B1
(45) Date of Patent: Jul. 5, 2022

(54) COLLAPSIBLE DUNNAGE

(71) Applicant: Patrick Morris, Omaha, NE (US)

(72) Inventor: Patrick Morris, Omaha, NE (US)

( * ) Notice: Subject to any disclaimer, the term of this patent is extended or adjusted under 35 U.S.C. 154(b) by 158 days.

(21) Appl. No.: 16/825,709

(22) Filed: Mar. 20, 2020

(51) Int. Cl.
*B60P 7/08* (2006.01)
*B60P 7/135* (2006.01)

(52) U.S. Cl.
CPC .................................. *B60P 7/135* (2013.01)

(58) Field of Classification Search
CPC .......... B60P 7/135; B60P 7/0892; B60P 7/13; B60P 3/077; B60T 3/00
USPC ..... 410/7–10, 19, 22, 30, 46, 49, 50, 39–40, 410/90, 91, 94, 120, 121, 155
See application file for complete search history.

(56) References Cited

U.S. PATENT DOCUMENTS

| | | | | |
|---|---|---|---|---|
| 2,903,094 | A * | 9/1959 | Andersen | B60T 3/00 188/32 |
| 4,310,271 | A * | 1/1982 | Canellis | B60P 3/07 410/30 |
| 6,755,599 | B1 * | 6/2004 | Plyler | B60P 3/077 410/30 |
| 7,189,041 | B1 | 3/2007 | Powell | |
| 7,503,738 | B1 * | 3/2009 | Doyle | B60P 7/0892 410/121 |
| 8,016,525 | B2 * | 9/2011 | Comeau | B60P 7/12 410/49 |
| 8,113,753 | B1 | 2/2012 | Grigg et al. | |
| 8,696,272 | B1 * | 4/2014 | Ragland | B60P 3/077 410/30 |
| 2012/0269595 | A1 * | 10/2012 | Fox | B60P 7/12 410/121 |
| 2014/0234048 | A1 * | 8/2014 | Adams | B60P 7/0892 410/121 |

OTHER PUBLICATIONS

Structural Plastics Corporation, http://spcindustrial.eom/dunnage.html#dcube, Printed Nov. 20, 2019, 2 pages.
Jolada Hydraroll Loading Technology, https://joloda.com/container-systems/container-loading/, Printed Nov. 20, 2019, 6 pages.
Container Equipement et Arrimage, http://www.containerequipement.com/en/products/equipments-for-containerisation/horizontal-loading-system.php. Printed Nov. 20, 2019, 2 pages.
Industrial Conveying (Australia), https://icaust.com.au/loading-unloading/, Printed Nov. 20, 2019, 7 pages.

* cited by examiner

*Primary Examiner* — Stephen T Gordon
(74) *Attorney, Agent, or Firm* — Suiter Swantz pc llo

(57) ABSTRACT

A dunnage device is disclosed. The dunnage device includes a mounting plate to secure the device to a trailer. The dunnage device is supported in a raised position by a first and second support plate. The dunnage device is configured to bear a load in the raised position by a load supporting plate connected to the first and second support plates. The dunnage device is able to transition between the raised position to a lowered position with a reduced profile. The translation of the dunnage device occurs by one or more pivotable connections.

20 Claims, 10 Drawing Sheets

COLLAPSIBLE DUNNAGE

TECHNICAL FIELD

The present invention generally relates to a device for cargo carriers, and more particularly to an accessory for ease of loading and unloading cargo carriers.

BACKGROUND

Cargo carriers are commonly used to haul cargo, and may take a variety of forms such as flatbed trailers. Such flatbed trailers have dominated the hauling industry, and are commonly used due to the ability to haul a variety of cargo types and configurations. One example of cargo hauled by flatbed trailers is palletized cargo, which is cargo that has been loaded onto a pallet. The pallet may provide a support structure for the cargo and includes one or more interior passages configured to receive the forks of a forklift. In this regard, palletized cargo may be easily loaded and unloaded onto the trailer by forklift. However, not all cargo may be easily palletized, due to a variety of considerations such as occupying a non-standard size. In these instances, the cargo carrier may desire the functionality of loading and unloading by forklift.

Flatbed drivers have previously accomplished the loading and unloading of non-standard cargo by forklift through the use of dunnage boards. The dunnage boards are typically four by four hardwood lumber which provide a space between the flatbed trailer and the cargo to be hauled. In this regard, a forklift driver may insert and remove the forklift forks underneath the cargo. However, in some instances it may be desirable to be able to haul material with no dunnage boards. To accomplish this, the dunnage boards must be removed and stowed away before being able to haul cargo.

Therefore, it would be advantageous to provide a device that can be easily configured for loading cargo by forklift while also being able to retain a low profile.

SUMMARY

A dunnage device is disclosed in accordance with one or more embodiments of the present disclosure. In one illustrative embodiment, the device includes a mounting plate configured to mount to a trailer. In another illustrative embodiment, the device includes a first support plate connected to the mounting plate by a first pivotable connection. In another illustrative embodiment, the device includes a first load supporting plate connected to the first support plate by a second pivotable connection, the load supporting plate being configured to receive a load. In another illustrative embodiment, the device includes a second support plate connected to the load supporting plate by a third pivotable connection. In another illustrative embodiment, the device is configured to transition between a raised position and a lowered position by the first, second, and third pivotable connection. In another illustrative embodiment, the raised position of the device provides a space between the trailer and the load. In another illustrative embodiment, the device is held in the raised position by a locking plate.

In another illustrative embodiment, a system of a plurality of dunnage devices are mounted to a trailer. In another illustrative embodiment, the plurality of dunnage devices are mounted to the trailer in a direction perpendicular to a driving direction. In another illustrative embodiment, the plurality of dunnage devices are mounted to the trailer in a direction parallel to a driving direction.

BRIEF DESCRIPTION OF THE DRAWINGS

The numerous advantages of the disclosure may be better understood by those skilled in the art by reference to the accompanying figures in which.

DETAILED DESCRIPTION OF THE INVENTION

Reference will now be made in detail to the subject matter disclosed, which is illustrated in the accompanying drawings.

Referring generally to FIGS. 1A-5B, a dunnage device 100 is disclosed, in accordance with one or more embodiments of the present disclosure.

Figure 1A:
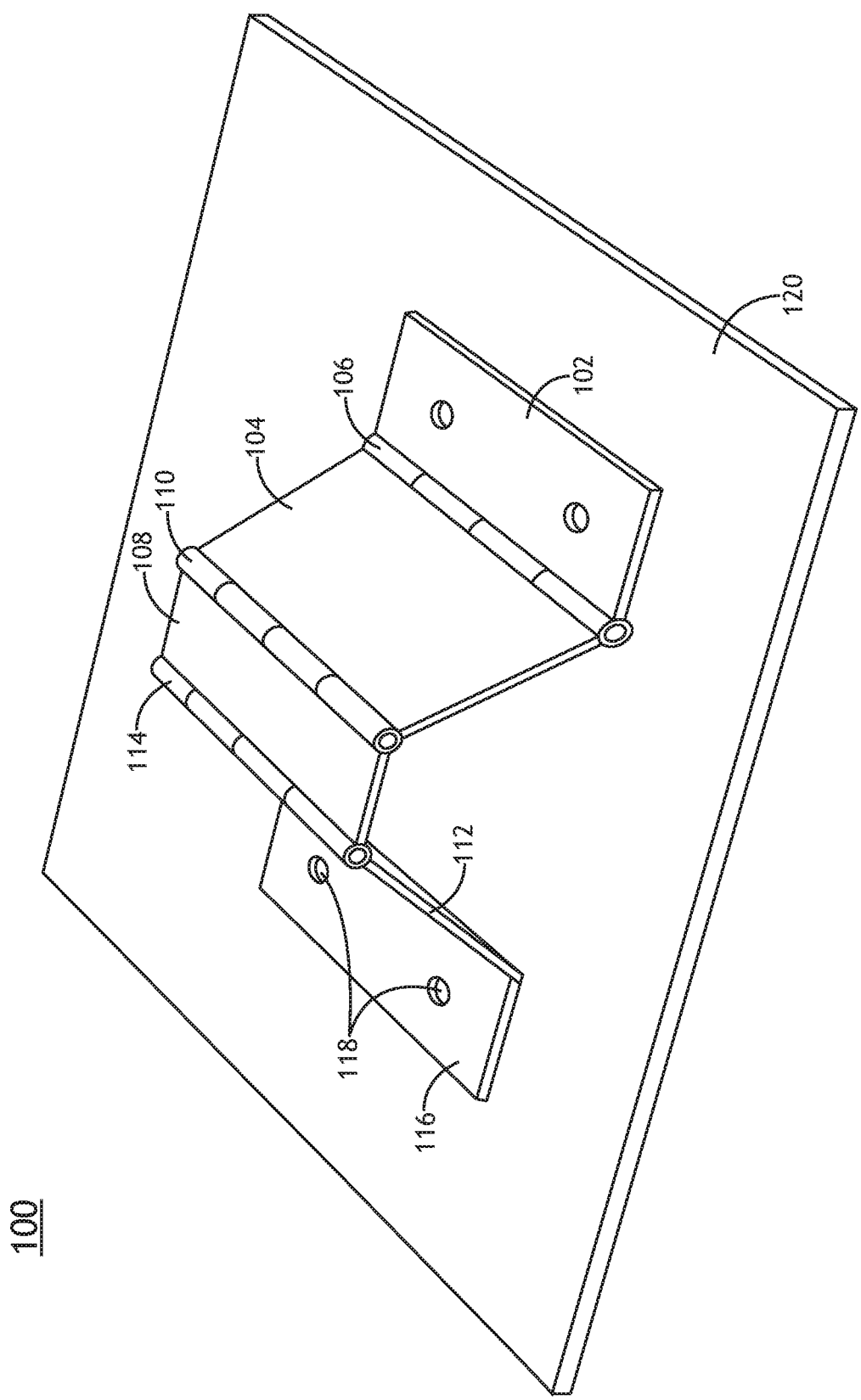
FIG. 1A illustrates a side orthographic view of a dunnage device mounted to a trailer in a raised position, in accordance with one or more embodiments of the present disclosure.
Figure 1B:
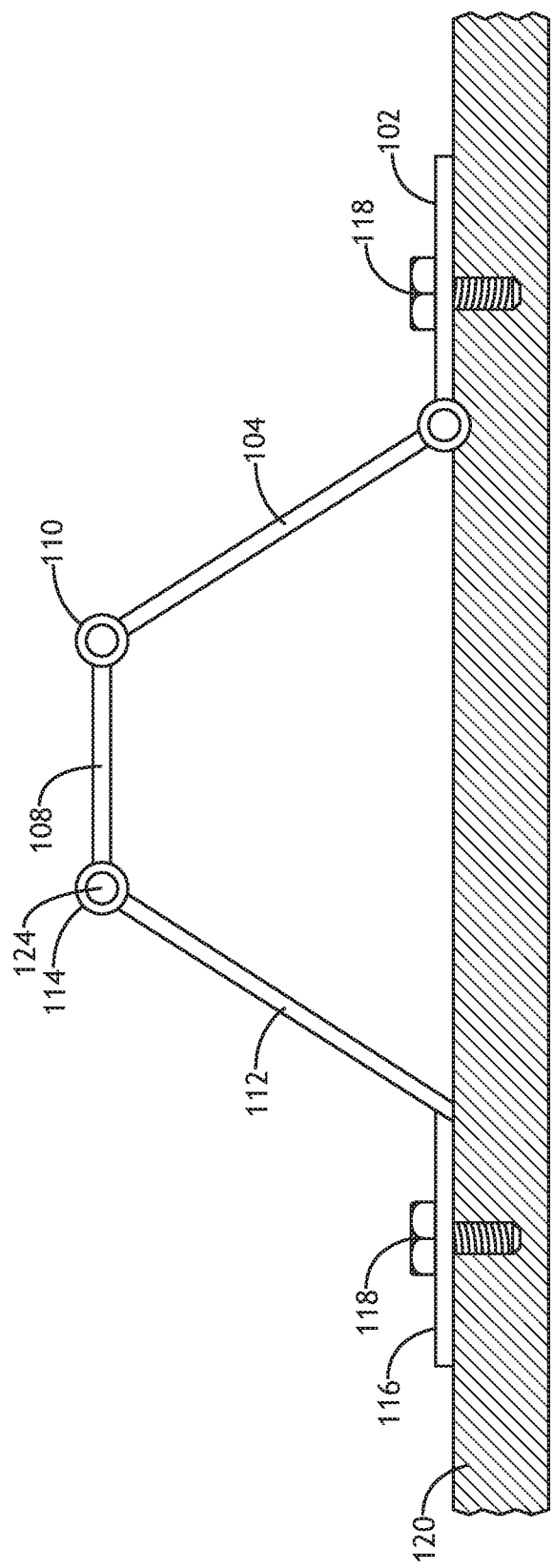
FIG. 1B illustrates a side profile view of the dunnage device of FIG. 1A, in accordance with one or more embodiments of the present disclosure.
Figure 2A:
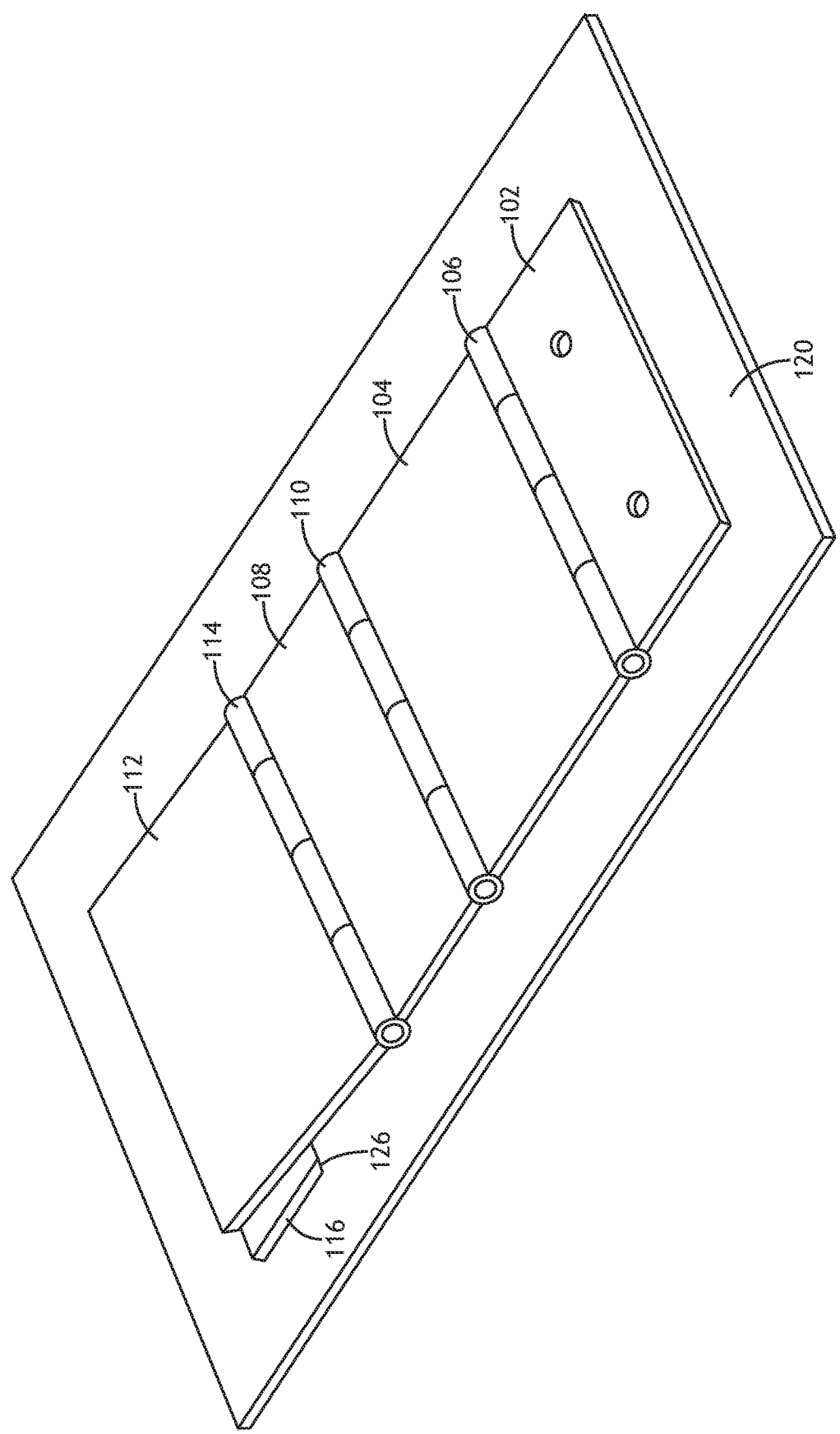
FIG. 2A illustrates a side orthographic view of a dunnage device mounted to a trailer in a lowered position, in accordance with one or more embodiments of the present disclosure.
Figure 2B:
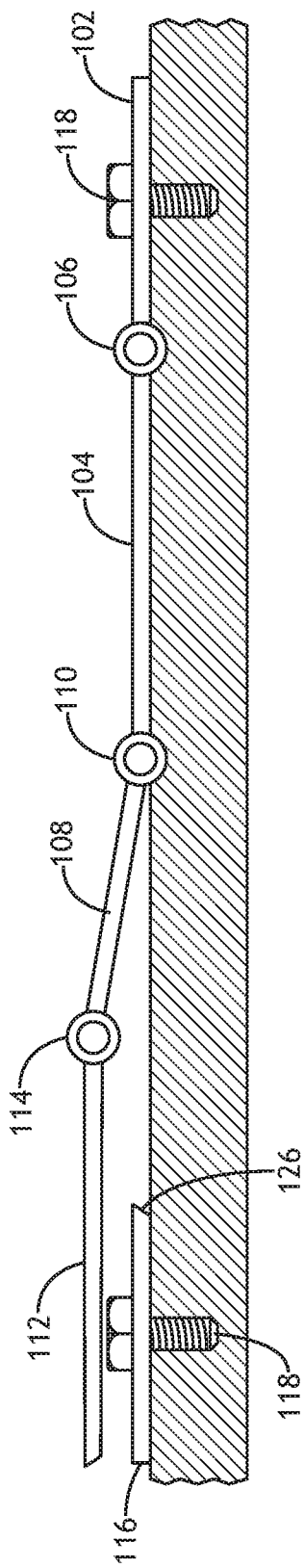
FIG. 2B illustrates a side profile view of a dunnage device, in accordance with one or more embodiments of the present disclosure.
Figure 3:
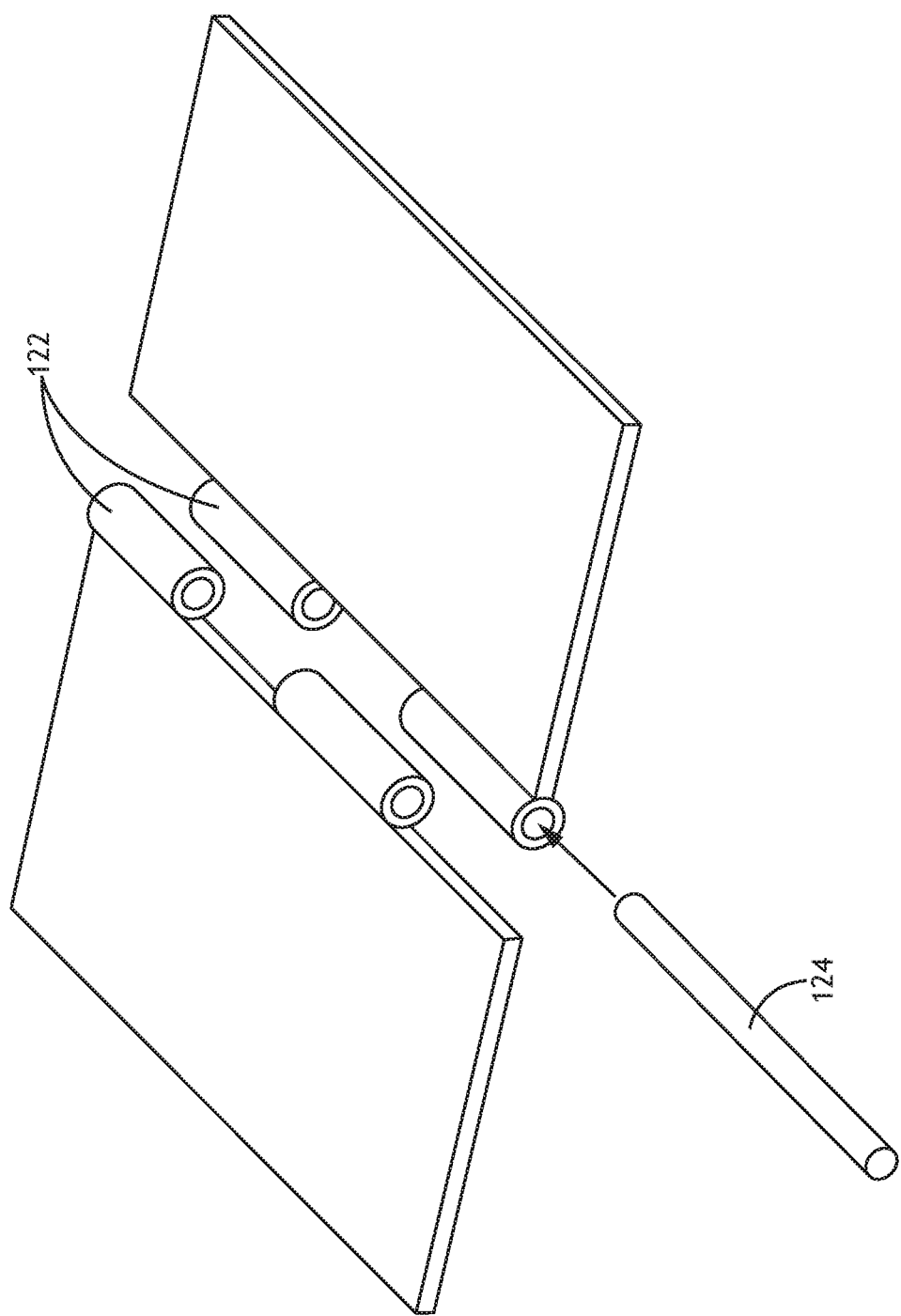
FIG. 3 illustrates a top orthographic view of a pivotable connection of a dunnage device, in accordance with one or more embodiments of the present disclosure.

Embodiments of the present disclosure are directed to a dunnage device 100 which provides for ease of hauling by flatbed trailer. The dunnage device 100 may be configurable between a raised position (as depicted in FIG. 1A-1B) and a lowered position (as depicted in FIG. 2A-2B). The raised position of the dunnage device 100 provides a space between a top surface of the trailer and a bottom surface of the load being carried. In this regard, the raised position allows for loading cargo onto the flatbed trailer by forklift, due to a space between a lower surface of the load and a top surface of the trailer. Furthermore, the lowered position of the dunnage device 100 has a minimal profile relative to the trailer, such that the flatbed may be operated while the dunnage device is in the lowered position without removing the dunnage device 100.

FIG. 1A illustrates a dunnage device 100, in accordance with one or more embodiments of the present disclosure.

In some embodiments, a dunnage device 100 is connected to a trailer 120 by a mounting plate 102. The dunnage device 100 further includes a first support plate 104 connected to the mounting plate 102 by a first pivotable connection 106. The first support plate 104 is connected to a load supporting plate 108 by a second pivotable connection 110. The load supporting plate 108 is connected to a second support plate 112 by a third pivotable connection 114. The dunnage device 100 is configurable between a raised position and a lowered position by the first pivotable connection 106, the second pivotable connection 110, and the third pivotable connection 114. The load supporting plate 108 is configured to hold a load when the dunnage device 100 is in the raised position. In this regard, the first support plate 104 and the second support plate 112 transfer the weight of the load onto the trailer 120. When the dunnage device 100 is in the raised position, the dunnage device 100 may elevate the load off of a surface of the trailer. The elevation of the load from the trailer 120 surface allows for the use of a forklift when loading and unloading the load.

In some embodiments, the dunnage device 100 may be held in the raised position by a locking plate 116. The locking plate 116 may be disposed at a position opposite of the mounting plate 102. For example, the locking plate 116 may act as a backstop for the second support plate 112 by stopping the movement of the dunnage device 100 when a load is placed on the load supporting plate 108. The locking plate 116 may include a side surface with a beveled edge 126. Such beveled edge 126 facilitates contact between the side surface and the second support plate 112 when the dunnage device 100 is in the raised position. The second support plate 112 may also feature a similar beveled edge to improve contact (depicted more clearly in FIG. 1B). The use of the beveled edge 126 on the locking plate and the second support plate improves the ability to carry a load without damaging the trailer 120 and/or the dunnage device 100. As depicted in FIG. 1B, the load supporting plate 108 may be parallel with the trailer 120 when the dunnage device 100 is in the raised position.

FIGS. 2A-2B depicts a lowered position of a dunnage device 100, in accordance with one or more embodiments of the present disclosure.

In some embodiments, the dunnage device 100 may be configured to transition from a raised position to a lowered position.

When the dunnage device 100 is in the raised position, the dunnage device has a profile suitable for loading and unloading a load by forklift, lift, hoist, sideloader, or other load lifting device. In this regard, when the dunnage device is in the raised position, a space between a bottom surface of a load supported by the dunnage device and a top surface of the trailer may have a height between 2 and 6 inches. Such height is generally defined by the length of the first support plate 104 and the second support plate 112 along with the corresponding angle of those plates when the dunnage device is in the raised position (as depicted in FIGS. 1A-1B).

When the dunnage device 100 is in the lowered position, the dunnage device has reduced profile as compared to the raised position. In this regard, when the dunnage device is in the lowered position, the dunnage device has a height between 0.5 and 1.5 inches. The height of the dunnage device is based on the thickness of one or more components of the dunnage device 100, such as, but not limited to, the mounting plate 102, first support plate 104, load supporting plate 108, second support plate 112, locking plate 116, fastener 118, first pivotable connection 106, second pivotable connection 110, or third pivotable connection 114. The ability to load material in either of the lowered position or the raised position may be advantageous for allowing a selective choice of the loading configuration based on prior setup, loading site conditions, a load to be hauled, or the like.

In some embodiments, one or more of the first pivotable connection 106, the second pivotable connection 110, and the third pivotable connection 114 are a hinge. The hinge may act as a bearing which constrains the movement of the dunnage device 100 to rotate about the hinge. The hinge (e.g., the first, second, or third pivotable connection) may include a plurality of knuckles 122 attached to one or more plates (e.g., the mounting plate, first support plate, load supporting plate, or the second support plate), with the knuckles 122 configured to be connected by a pin 124 (as depicted more clearly in FIG. 3). It is to be understood that the number and configuration of the knuckles 122 and pin 124 is not intended as limiting the scope of the present disclosure. For example, the hinge may be any type of hinge, including but not limited to a spring-loaded hinge, a quick disconnect hinge, a slip joint hinge, an overlay hinge, a strap hinge, or a butt hinge.

In some embodiments, the mounting plate 102 and the locking plate 116 may be connected to the trailer 120 by any suitable means, including but not limited to, fasteners 118 (e.g., bolts, screws, or rivets) or welding. In this regard, the mounting plate 102 (and similarly dunnage device 100) may be retrofitted onto existing flatbed trailers with minimal setup. Furthermore, the use of fasteners 118 allows for detachable attachment to the trailer 120.

FIGS. 4A-5B depict configurations of one or more dunnage device 100 mounted to a trailer 120, in accordance with one or more embodiments of the present disclosure.

Figure 4A:
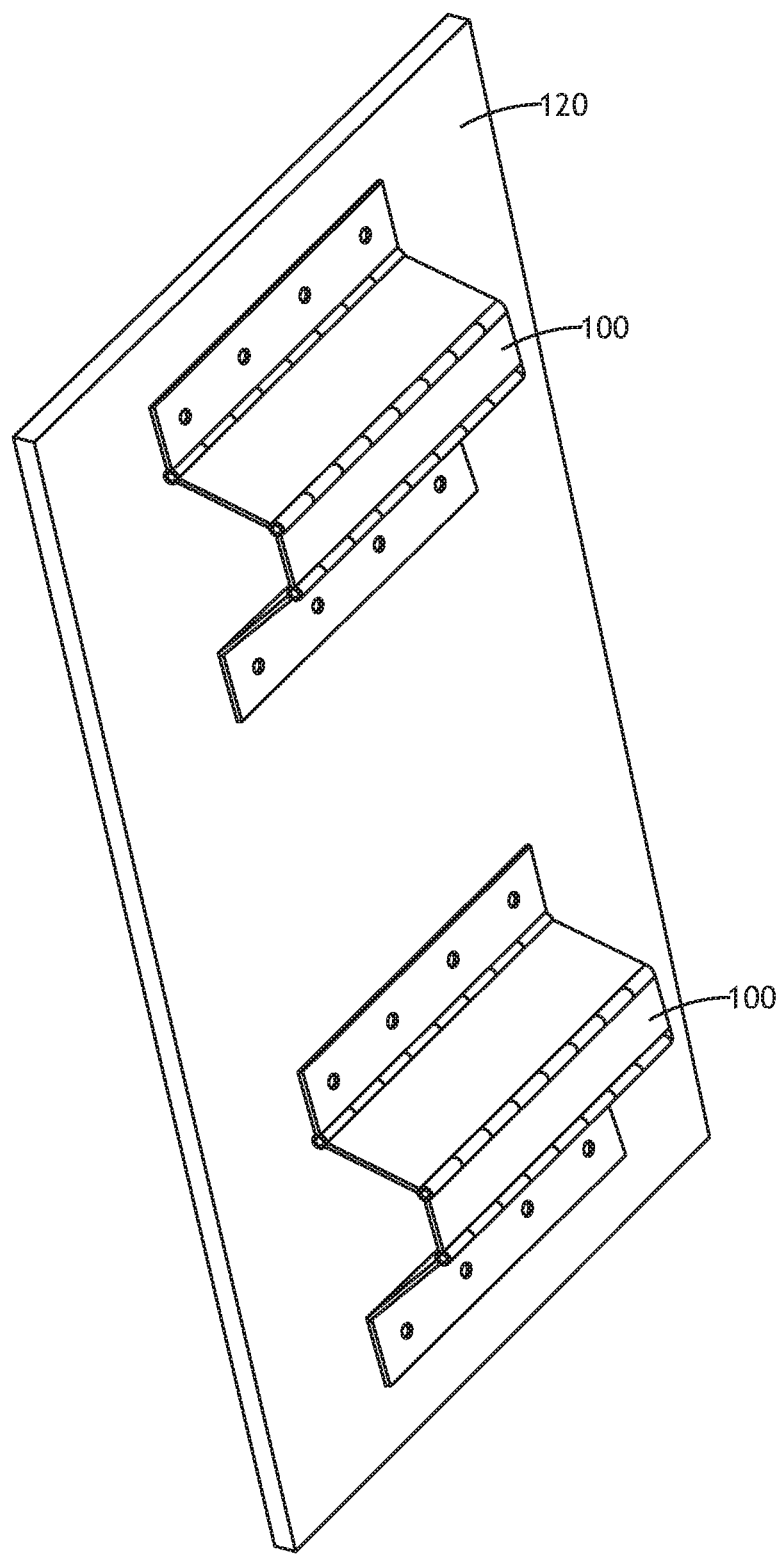
FIG. 4A illustrates a top orthographic view a plurality of dunnage devices connected to a trailer, in accordance with one or more embodiments of the present disclosure.
Figure 4B:
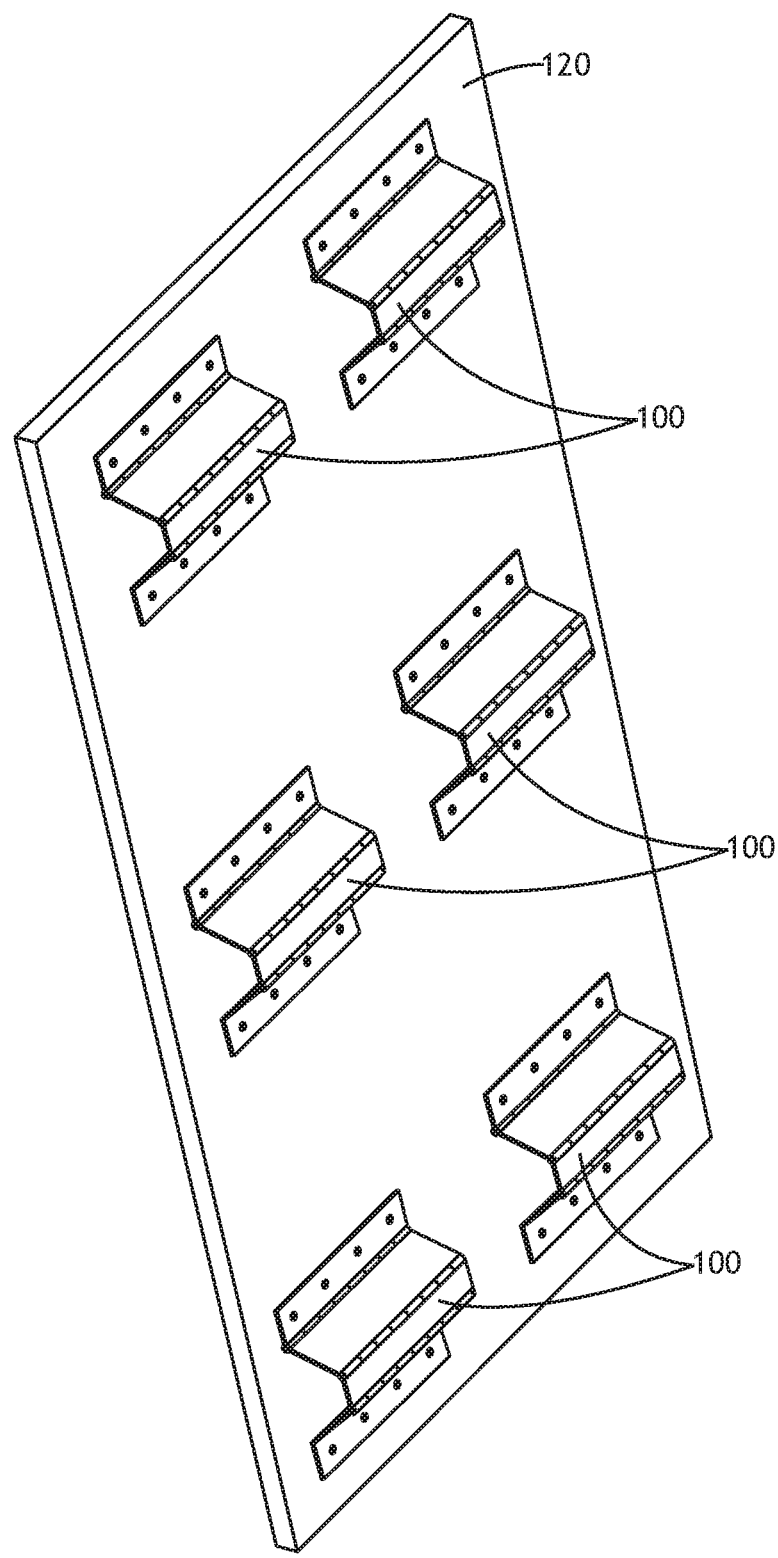
FIG. 4B illustrates a top orthographic view a plurality of dunnage devices connected to a trailer, in accordance with one or more embodiments of the present disclosure.
Figure 4C:
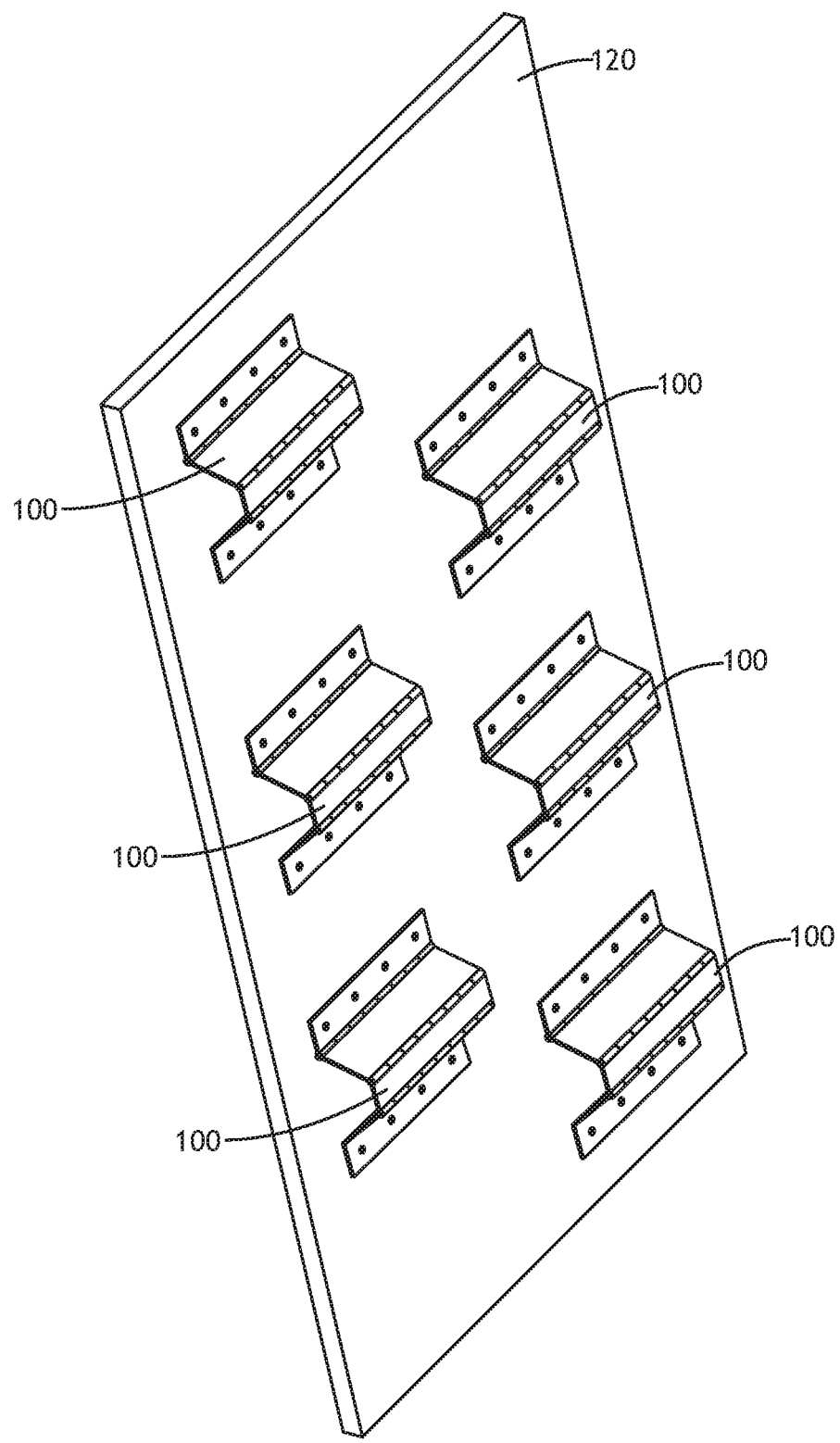
FIG. 4C illustrates a top orthographic view a plurality of dunnage devices connected to a trailer, in accordance with one or more embodiments of the present disclosure.

In some embodiments, the dunnage device 100 may be mounted to the trailer 120 perpendicular the driving direction, as depicted in FIGS. 4A-4C. For example, FIG. 4A depicts the dunnage device 100 occupying a substantial portion of the width of the trailer 120. In this regard, the dunnage device 100 may be raised and lowered to allow for a load to be supported by the dunnage device in each of said positions. Furthermore, when the dunnage device is in the raised position, a forklift may be used to load and unload the supported load from a side of the trailer. Although FIG. 4A depicts the dunnage device 100 as extending along a substantial portion of the width of the trailer 120, this is not intended as a limitation on the present disclosure. For example, several dunnage devices 100 with a smaller width may be placed in tandem, as depicted in FIG. 4B. The use of dunnage devices 100 in the tandem configuration may be desirable in reducing the weight of the dunnage device to improve in ease of raising and lowering the device. By way of another example, a plurality of dunnage devices 100 may be attached in a staggered configuration on the trailer 120, as depicted in FIG. 4C.

Figure 5A:
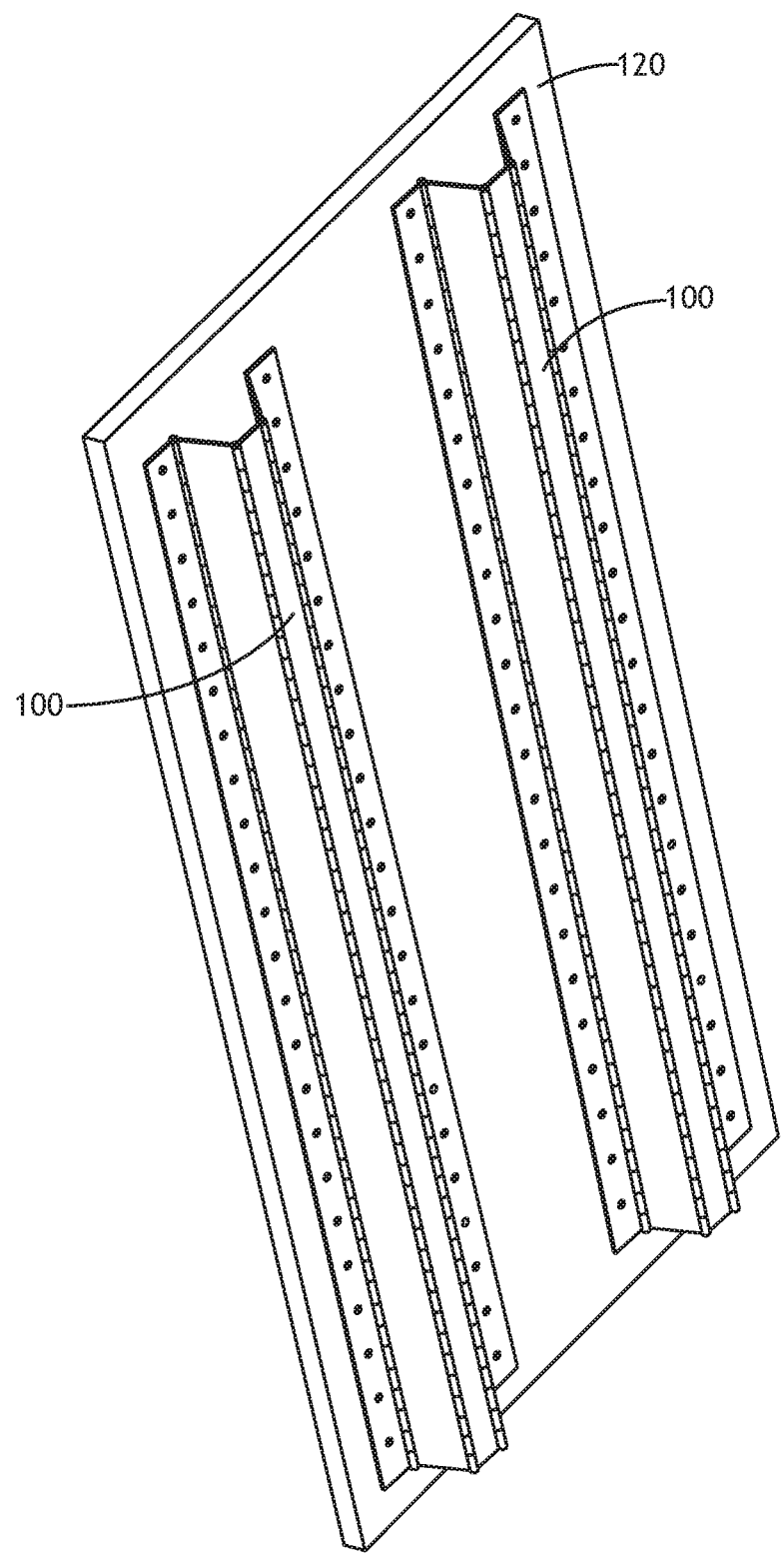
FIG. 5A illustrates a top orthographic view a plurality of dunnage devices connected to a trailer, in accordance with one or more embodiments of the present disclosure.
Figure 5B:
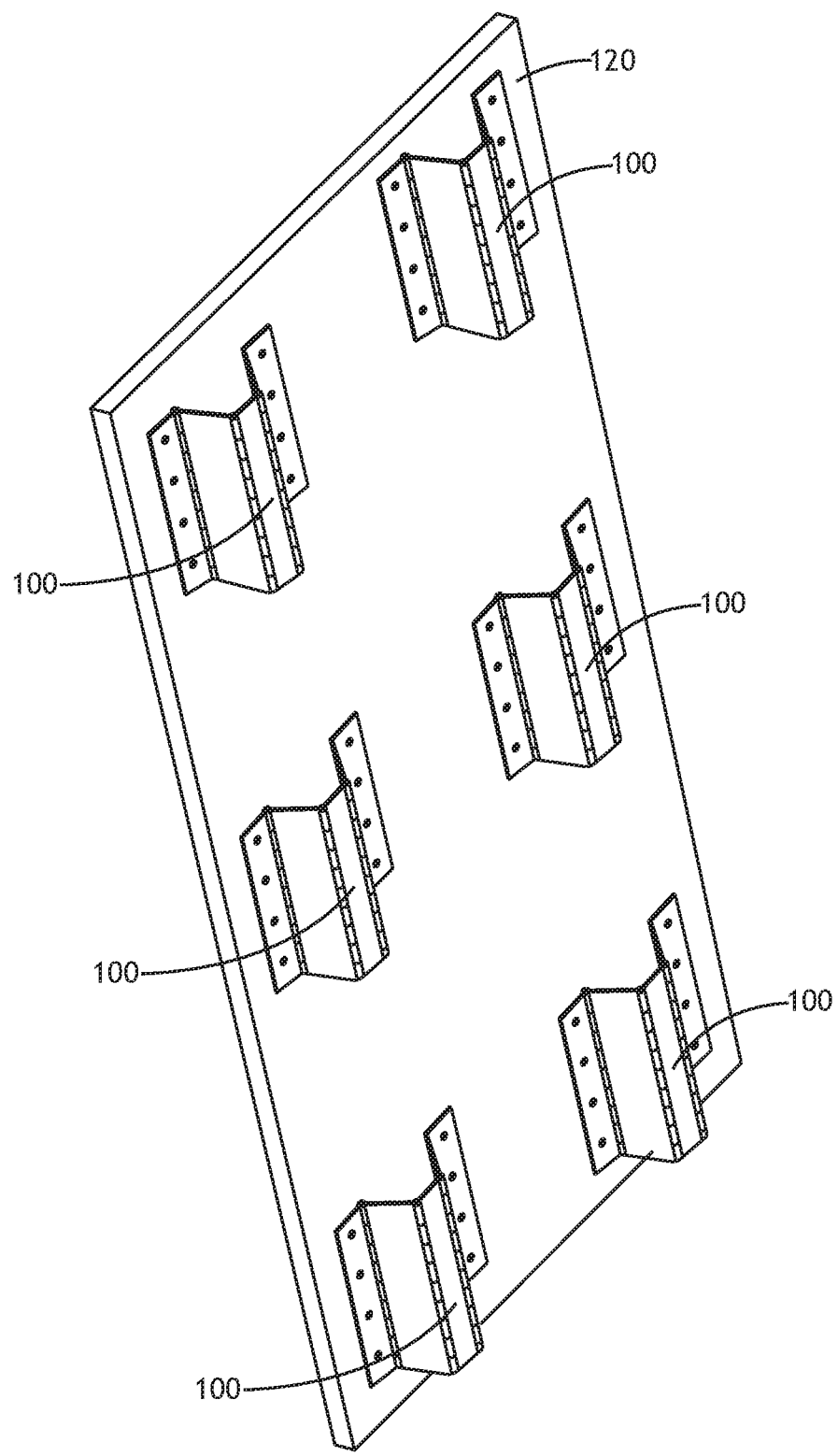
FIG. 5B illustrates a top orthographic view a plurality of dunnage devices connected to a trailer, in accordance with one or more embodiments of the present disclosure.

In some embodiments, the dunnage device 100 may be mounted to the trailer parallel to the driving direction, as depicted in FIGS. 5A-5B. For example, FIG. 5A depicts two dunnage devices 100, where each dunnage device 100 extends along a substantial portion of a length of the trailer 120. In this regard, a load may be supported by the two dunnage devices 100 when in the raised or lowered position. Furthermore, the load may be loaded and unloaded by a forklift from the rear of the trailer. By way of another example, FIG. 5B depicts a plurality of dunnage devices attached to the trailer 120 perpendicular to the driving direction.

Referring generally again to FIGS. 1A-5B, there may be additional or alternative components of a dunnage device 100.

In some embodiments, the dunnage device 100 is secured by a latch while in the lowered position (not depicted). The latch may include any kind of hardware suitable for securing the dunnage device in the lowered position thereby preventing movement of the dunnage device 100. For example, the mechanical latch may include, but is not limited to, a cam lock, a grab latch, a magnetic latch, a toggle clamp, or a barrel latch.

In some embodiments, the dunnage device 100 may rest on one or more shock absorbers while in the lowered position (not depicted). The shock absorbers may include any kind of shock absorber suitable for reducing vibrations in the dunnage device while in the lowered position, such as, but not limited to, rubber bumpers or vibration damping pads.

In some embodiments, the dunnage device 100 includes a handle to provide ease of access while transitioning between the raised and lowered position. Such handle may be attached to the dunnage device 100 at any point, including, but not limited to, the load supporting plate 108. Furthermore, the handle may be formed of the same material as the plate (e.g., during a manufacturing process), or may be separately attached to the plate.

In some embodiments, the second support plate 112 includes one or more holes configured to receive the fasteners 118 of the locking plate 116 (not depicted). Such holes may be any suitable geometry for receiving the fasteners 118, including, but not limited to, circular holes and hexagonal holes. The ability to receive the fasteners 118 of the locking plate 116 may reduce a profile of the dunnage device 100 while in the lowered position (e.g., by an amount equal to a height of the bolt head). Furthermore, any load supported by the second support plate 112 while in the lowered position may be transferred directly to the locking plate 116, rather than to the fasteners 118, thereby reducing the wear on the fasteners 118. The recitation of the holes on the second support plate 112 is not intended to be limiting. For example, either of the load supporting plate 108 or the first support plate 104 may feature similar holes for receiving the fasteners 118, based on the dimension and configuration of the dunnage device 100.

One or more components of the dunnage device 100 may comprise one or more suitable materials known in the art, such as, but not limited to aluminum or steel. It is envisioned that in embodiments where one or more of the components is a steel material, said component may be cold-forged, hot-forged, heat treating (e.g. annealing, quenching, tempering, etc.), surface treated, or treated with any other process to selectively adjust the material properties of the component, thereby improving strength and corrosion resistance. Furthermore, such steel material may include one or more sizes of steel plate, such as, but not limited to, 0 gauge (½"), 3 gauge (¼"), 7 gauge (³⁄₁₆"), 10 gauge (⁹⁄₆₄"), 11 gauge (⅛").

It is to be understood that the dimensions of one or more components depicted in the accompanying figures is not intended to be limiting. For example, one or more of the plates (e.g., mounting plate 102, first support plate 104, second support plate 112, load supporting plate 108, or locking plate 116) may feature any suitable dimensions for transitioning between a raised and a lowered position. The one or more plates may be designed as a mechanical linkage with movement constrained by the one or more hinges (e.g., first, second, or third pivotable connections). Such movement constraint may generally reduce the degrees of freedom between connected plates to one, such that only rotation about the hinge is allowed. Considerations when selecting plate dimensions include, but are not limited to, ability of the dunnage device to bear a load when in the raised position and lowered position, elevation of the load supporting plate 108 from the trailer 120 when in the raised position (e.g., to allow for insertion of forklift), ease of manufacturing, and ease of assembly. In this regard, the mounting plate 102 and the locking plate 116 may have a similar width as the load supporting plate 108 (e.g., between 2 and 3 inches or more), and the first support plate 104 and second support plate 112 may have a similar width (e.g., between 4 to 8 inches or more). Such width of the first and second support plates 104, 112 and a corresponding angle (depicted in FIG. 1B at 65 degrees from horizontal) may allow the device to provide a space between 2 to 6 inches or more, in accordance with one or more embodiments of the present disclosure. The angles of first and second support plates 104, 112 in the raised position depicted is not intended to be limiting. For example, either of the first or second support plates 104, 112 may have any suitable angle for raising the load supporting plate for supporting a load in the raised position, such as, but not limited to, between 45 and 90 degrees from the horizontal. Similarly, the length of the one or more plates depicted is not intended to be limiting. In this regard, the length of the plates may be determined based on the particular configuration of the dunnage device. For example, where the dunnage devices are arranged in a side-by-side configuration, the length of the one or more plates may be from 8 to 36 inches or more. By way of another example, where the dunnage devices occupy a substantial width or length of the trailer, the one or more plates may be from 72 to 96 inches or more.

A dunnage device according to the present disclosure may be attached to a trailer in a variety of configurations. For example, the dunnage device may be retrofitted onto existing flatbed trailers by attaching the dunnage device to one or more surfaces of the trailer (e.g., a trailer deck). By way of another example, the dunnage device may be pre-built into the trailer. In this regard, the flatbed trailer may include one or more recesses to receive the dunnage device, such that the trailer and a top surface of the dunnage device are coplanar when the dunnage device is in the lowered position.

In some embodiments, the dunnage device is retained in the raised position by a locking plate attached to the trailer 120. Such locking plate may be a separate component of the device. Alternatively, the locking plate may built-in to the dunnage device, such that the mounting plate and the locking plate are connected (e.g., formed of one piece of plate steel). In this regard, a plurality of dunnage devices may each be raised a similar distance off of the trailer when in the raised position.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

Although particular embodiments of this invention have been illustrated, it is apparent that various modifications and embodiments of the invention may be made by those skilled in the art without departing from the scope and spirit of the foregoing disclosure. It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes. Accordingly, the scope of the invention should be limited only by the claims appended hereto.

What is claimed:

1. A dunnage device, comprising:
a mounting plate configured to mount to a trailer;
a first support plate connected to the mounting plate by a first pivotable connection between the mounting plate and the first support plate;
a load supporting plate connected to the first support plate by a second pivotable connection between the load supporting plate and the first support plate, the load supporting plate configured to support a load;
a second support plate connected to the load supporting plate by a third pivotable connection between the second support plate and the load supporting plate; the dunnage device configurable between a raised position and a lowered position by the first pivotable connection, the second pivotable connection, and the third pivotable connection; and
a locking plate, wherein the dunnage device is held in the raised position by contact between a side surface of the locking plate and the second support plate; wherein the dunnage device is configured to provide a space between a top surface of the trailer and a bottom surface of the load when in the raised position.

2. The dunnage device of claim 1, wherein the locking plate is configured to mount to the trailer at a position opposite of the mounting plate.

3. The dunnage device of claim 2, wherein the locking plate and the mounting plate are formed from a single piece of metal to connect the mounting plate and the locking plate.

4. The dunnage device of claim 2, wherein the locking plate is configured to mount to the trailer independently of the mounting plate.

5. The dunnage device of claim 1, wherein at least one of the first pivotable connection, the second pivotable connection, or the third pivotable connection is a hinge, the hinge including a plurality of knuckles connected by a pin.

6. The dunnage device of claim 2, wherein at least one of the mounting plate or the locking plate is configured to mount to the trailer by a fastener or a weld.

7. The dunnage device of claim 1, wherein at least one of the mounting plate, the first support plate, the load supporting plate, or the second support plate is formed of plate steel.

8. The dunnage device of claim 2, wherein the second support plate includes a beveled edge configured to contact a beveled edge of the locking plate when the dunnage device is in the raised position.

9. The dunnage device of claim 6, wherein the second support plate includes one or more holes configured to receive the fastener mounting the locking plate to the trailer when the dunnage device is in the lowered position.

10. The dunnage device of claim 1, wherein the space between the top surface of the trailer and the bottom surface of the load provided in the raised position has a height between 2 to 6 inches.

11. The dunnage device of claim 1, wherein the dunnage device has a height between 0.5 and 1.5 inches when in the lowered position.

12. A dunnage device, comprising:
a mounting plate configured to mount to a trailer;
a first support plate connected to the mounting plate by a first pivotable connection between the mounting plate and the first support plate;
a load supporting plate connected to the first support plate by a second pivotable connection between the load supporting plate and the first support plate, the load supporting plate configured to support a load;
a second support plate connected to the load supporting plate by a third pivotable connection between the second support plate and the load supporting plate; and
a locking plate, wherein the locking plate and the mounting plate are formed from a single piece of metal to connect the mounting plate and the locking plate, wherein the locking plate is configured to support the dunnage device in a raised position by contact between a side surface of the locking plate and the second support plate; the dunnage device configurable between the raised position and a lowered position by the first pivotable connection, the second pivotable connection, and the third pivotable connection;
wherein the dunnage device is configured to provide a space between a top surface of the trailer and a bottom surface of the load when in the raised position.

13. A system, comprising:
a flatbed trailer,
a plurality of dunnage devices mounted to the flatbed trailer, one or more dunnage devices of the plurality of dunnage devices comprising:
a mounting plate configured to mount to a trailer;
a first support plate connected to the mounting plate by a first pivotable connection between the mounting plate and the first support plate;
a load supporting plate connected to the first support plate by a second pivotable connection between the load supporting plate and the first support plate, the load supporting plate configured to support a load;
a second support plate connected to the load supporting plate by a third pivotable connection between the second support plate and the load supporting plate; and
a locking plate, wherein each of the plurality of dunnage devices are supported in a raised position by a contact between the second support plate and a side surface of the locking plate, each of the plurality of dunnage devices configured to transition from the raised position to a lowered position.

14. The system of claim 13, wherein the dunnage devices are mounted to the flatbed trailer in a direction parallel to a driving direction.

15. The system of claim 14, wherein the dunnage devices are arranged in a tandem configuration.

16. The system of claim 4, wherein the dunnage devices are arranged in a staggered configuration.

17. The system of claim 13, wherein the dunnage devices are mounted to the flatbed trailer in a direction perpendicular to a driving direction.

18. The dunnage device of claim 1, wherein the load supporting plate is parallel to the trailer when the dunnage device is in the raised position.

19. The dunnage device of claim 1, wherein the first support plate and the second support plate are each oriented at an angle between 45 degrees and 90 degrees from horizontal when the dunnage device is in the raised position.

20. The system of claim 13, wherein the load supporting plate is parallel to the flatbed trailer when the plurality of dunnage devices are in the raised position.

* * * * *